United States Patent
Jenkins, IV

(10) Patent No.: US 7,308,564 B1
(45) Date of Patent: Dec. 11, 2007

(54) METHODS AND CIRCUITS FOR REALIZING A PERFORMANCE MONITOR FOR A PROCESSOR FROM PROGRAMMABLE LOGIC

(75) Inventor: Jesse H. Jenkins, IV, Danville, CA (US)

(73) Assignee: Xilinx, Inc., San Jose, CA (US)

( * ) Notice: Subject to any disclaimer, the term of this patent is extended or adjusted under 35 U.S.C. 154(b) by 522 days.

(21) Appl. No.: 10/402,057

(22) Filed: Mar. 27, 2003

(51) Int. Cl.
G06F 11/267 (2006.01)
G06F 11/34 (2006.01)

(52) U.S. Cl. .................................... 712/227
(58) Field of Classification Search ............... 712/227
See application file for complete search history.

(56) References Cited

U.S. PATENT DOCUMENTS

| | | | |
|---|---|---|---|
| 5,321,828 A * | 6/1994 | Phillips et al. ............... | 703/28 |
| 5,581,482 A | 12/1996 | Wiedenman et al. | |
| 5,835,702 A | 11/1998 | Levine et al. | |
| 5,867,644 A | 2/1999 | Ranson et al. | |
| 5,874,834 A * | 2/1999 | New .......................... | 326/39 |
| 5,968,188 A * | 10/1999 | Rana ........................... | 714/29 |
| 6,115,763 A * | 9/2000 | Douskey et al. ............. | 710/72 |
| 6,182,247 B1 * | 1/2001 | Herrmann et al. ........... | 714/39 |
| 6,272,451 B1 * | 8/2001 | Mason et al. ................ | 703/13 |
| 6,351,724 B1 | 2/2002 | Klassen et al. | |
| 2003/0163298 A1 * | 8/2003 | Odom et al. ................. | 703/21 |

OTHER PUBLICATIONS

Haynes et al. "A Reconfigurable Multiplier Array For Video Image Processing Tasks, Suitable For Embedding In An FPGA Structure". IEEE Symposium on FPGAs for Custom Computer Machines, Napa, California, 1998.*

Jesse H. Jenkins, IV, et al., "Control Overhead-A Performance Metric for Evaluating Control-Unit Designs," IEEE Transactions On Computers, Apr. 1980, pp. 300-307, vol. c-29, No. 4, available from Lawrence Livermore Laboratory, University of California, Livermore, CA 94550.

* cited by examiner

Primary Examiner—Eddie Chan
Assistant Examiner—Robert E. Fennema
(74) Attorney, Agent, or Firm—T. Lester Wallace; John J. King

(57) ABSTRACT

A performance monitor is realized from programmable logic on the same integrated circuit as a processor. A user may use a programming and analysis tool to select a performance monitor soft core and to program it into the integrated circuit. The performance monitor is used to debug and/or monitor operation of the processor. After the debugging and/or performance monitoring, the portion of the programmable logic used to realize the performance monitor can be reconfigured and used to realize another portion of the user-specific circuit. Because the portion of the integrated circuit used to realize the performance monitor can be later used in the user-specific design, the cost of having to provide a no-longer-desired performance monitor in each integrated circuit used in the user's design is avoided. Because the performance monitor is realized from programmable logic, the performance monitor is more flexible than a conventional hardwired configurable performance monitor.

28 Claims, 3 Drawing Sheets

METHODS AND CIRCUITS FOR REALIZING A PERFORMANCE MONITOR FOR A PROCESSOR FROM PROGRAMMABLE LOGIC

FIELD OF THE INVENTION

The present invention relates to performance monitors and programmable logic devices.

BACKGROUND OF THE INVENTION

In debugging and optimizing processor systems it is often desired to be able to monitor the performance of the processor. Some modern microprocessors therefore include performance monitoring hardware (also called "performance monitors"). The performance monitor circuitry is disposed on the same integrated circuit chip along with the microprocessor itself and may even be considered part of the microprocessor. A user who is debugging the system can use the performance monitor hardware on the microprocessor to collect diagnostic information about the operation of the processor. The user may, for example, set traps or halt the microprocessor at certain locations in the microprocessor code. The user can also use the performance monitor to collect state information at various points in the operation of the processor. The user can also collect histogram data indicating how much time the microprocessor spends executing in each of several different parts of the code.

U.S. Pat. No. 6,351,724 discloses a microprocessor that includes a performance monitor. The performance monitor includes, among other things, a bus monitor unit and a memory unit. The bus monitor unit is coupled to the address, data and control lines of the microprocessor. A data acquisition period is divided into a number of histogram time periods. As the microprocessor operates and executes instructions, the bus monitor unit detects when one of up to sixty-four user-definable events occurs. The performance monitor may also store the number of times a particular user-defined event occurs during each of a plurality of histogram time periods. The event count is stored into one of a plurality of memory locations that corresponds to the associated histogram time period. The stored event counts form a sort of histogram. After the acquisition period is over, the stored contents of the memory locations can be read out from the performance monitor and analyzed during the debugging of the processor system.

Although the events detected by the performance monitor of U.S. Pat. No. 6,351,724 are selectable by the user, the capabilities of the performance monitor are quite limited. The performance monitor circuit is to be embodied in each microprocessor manufactured and sold. Making a larger and more flexible performance monitor having more capabilities might be nice from the perspective of the person debugging the system, but the added cost of having to provide the necessary such hardware on each microprocessor integrated circuit serves to limit the economically realizable capabilities of the performance monitor.

U.S. Pat. No. 5,867,644 discloses another user-configurable performance monitor that is disposed on the same chip with a microprocessor. The performance monitor includes a programmable state machine, a plurality of on-chip input sources, and a plurality of counters. The input sources include user-configurable comparators located within the functional blocks of the microprocessor. The comparators are coupled to storage elements, and can be configured by the user to monitor nodes to determine whether the state of the nodes matches the data contained in the storage elements. By changing data in the storage elements, the user may change the information against which the state of the nodes is compared.

The output devices include a plurality of counters. The state machine can, for example, be configured to increment a particular counter so that the counter functions as an event counter that keeps a tally of the number of times a certain user-defined event has occurred. A signal output by a counter may be used as a input to the state machine, so that one event may be defined as a function of a different event having occurred a certain number of times. By configuring the performance monitor appropriately, the user can generate triggers that halt the microprocessor, trap the microprocessor and/or latch the states of numerous test nodes within the microprocessor in "sample-on-the-fly" fashion.

Despite the fact that the performance monitor is user-configurable, its configurability is limited. There are, for example, a fixed number of output counters that can operate as event counters. The number of bits in each counter is not freely adjustable. Each counter is realized in dedicated hardware and therefore has a predetermined number of bits. There are a fixed number of comparators, and each comparator can compare values of a fixed number of bits. The state machine is programmable, but the number of states that the state machine can have is limited by the fixed number of sequential logic elements provided for this purpose. Added functionality in the performance monitor cannot be provided without increasing the amount of semiconductor die area dedicated to the performance monitor and without increasing the cost of the microprocessor integrated circuit. The user of such a performance monitor is therefore sometimes stuck having to make do with a general purpose and limited function performance monitor that is not necessarily optimal for the user's diagnostic purpose.

An improved, more flexible and more cost-effective performance monitoring capability is sought.

SUMMARY

An on-chip performance monitor is realized from programmable logic on the same integrated circuit as a processor core. The programmable logic may, for example, be flexible SRAM-based reconfigurable programmable logic of a field programmable gate array. The processor core can be either a hardwired "hard core" processor core or a "soft core" processor that is programmed into the programmable logic of the integrated circuit.

In one embodiment, a user uses a programming and analysis tool to select a performance monitor soft core from a library of soft cores. The user uses the programming and analysis tool to program the selected performance monitor soft core into the programmable logic portion of the integrated circuit. Prior to programming the integrated circuit, a netlist optimizer executing within the programming and analysis tool may remove parts of the performance monitor that will not be used when monitoring the performance of the user-specific design.

The performance monitor is then used to debug and/or monitor operation of the processor as it operates and interacts with the rest of the user-specific circuit. The user may use the programming and analysis tool to retrieve, view and analyze performance data collected by the performance monitor during the debugging and performance monitor operation.

After the debugging and/or performance monitoring has been completed, the portion of the programmable logic used to realize the performance monitor is reconfigured and used to realize another portion of the user-specific circuit.

Because the portion of the integrated circuit used to realize the performance monitor is later usable in the user-specific design, the cost of having to provide a no longer desired performance monitor circuit in each integrated circuit used in the user's product is avoided. A relatively large and powerful performance monitor circuit can therefore be programmed into the integrated circuit and used to debug processor operation without significant cost because the large performance monitor circuit does not have to be embodied in the ultimate integrated circuit used by the user in the user's product.

Because the performance monitor is realized from flexible programmable logic, the performance monitor circuitry can be customized to the full extent permitted by the programmable logic. The functionality of the performance monitor is not limited to the predetermined functions of a one-size-fits-all general purpose performance monitor.

Other structures and methods are described in the detailed description below. This summary does not purport to define the invention. The invention is defined by the claims.

DETAILED DESCRIPTION

Figure 1:
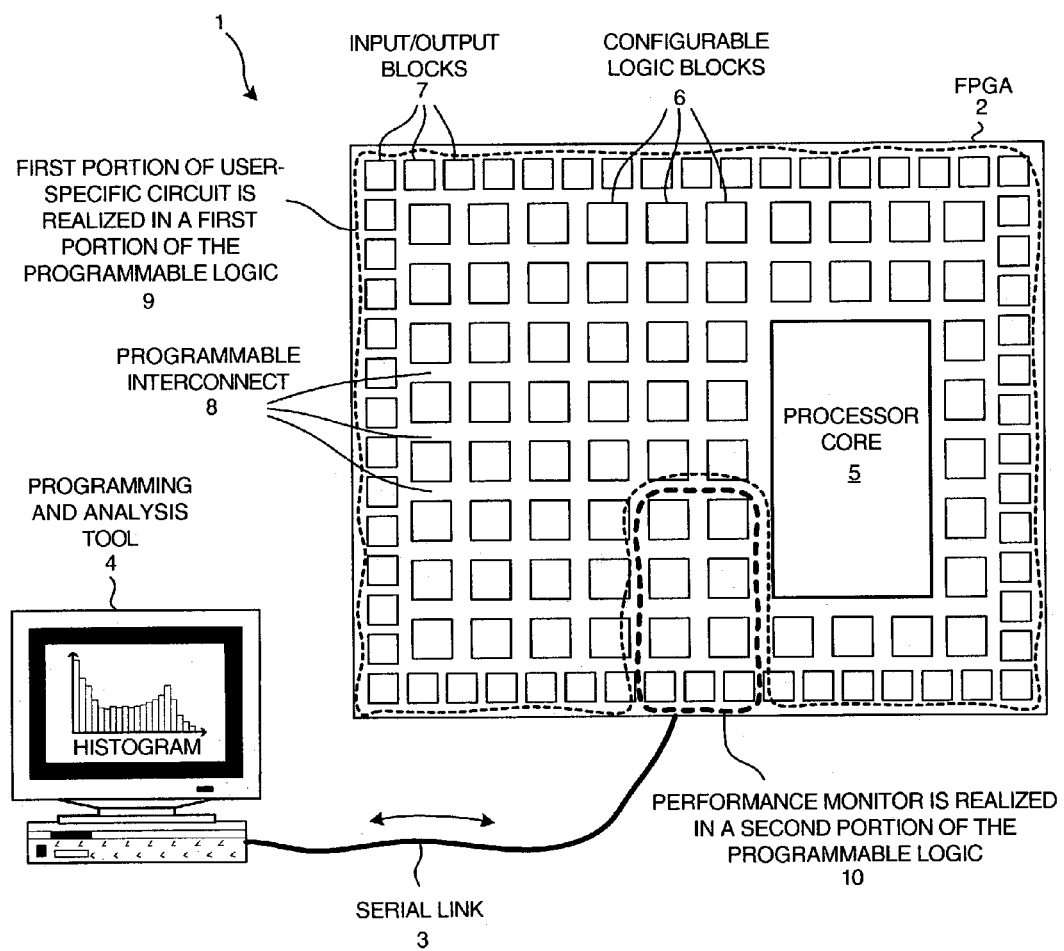
FIG. 1 is a simplified conceptual diagram of a system in accordance with an embodiment of the present invention.

FIG. 1 is a simplified diagram of a system 1 in accordance with an embodiment of the present invention. System 1 includes an integrated circuit 2 that is linked by a serial link 3 and other interface circuitry (not shown) to a programming and analysis tool 4. The interface circuitry may, for example, include a small printed circuit board with a socket that makes electrical contact with the various terminals of integrated circuit 2. Due to space constraints and to simplify and clarify the explanation of the invention, the interface circuitry is not shown in the diagram.

In the illustrated example, integrated circuit 1 is a field programmable gate array (FPGA) that includes a processor core 5 and a programmable logic portion. The programmable logic portion includes a matrix of configurable logic blocks (CLBS) 6 surrounded by a ring of input/output blocks (IOBs) 7. The IOBs and the CLBs can be coupled; together in a desired manner by a programmable interconnect structure 8. Each of the CLBs, the programmable interconnect structure, and the IOBs includes configuration memory cells, the contents of which determine how the CLB, the programmable interconnect structure, or the IOB is configured. To realize a user-defined circuit, configuration data is loaded into the configuration memory cells such that the CLBs and IOBs are configured to realize particular circuit components in the user-defined circuit. Configuration data is also loaded into the configuration memory cells of the programmable interconnect structure such that the programmable interconnect structure connects the various configured CLBs and IOBs in a desired manner to realize the user-defined circuit.

In the present example, a user designs a user-specific circuit using programming and analysis tool 4. A netlist representing the user-specific circuit is generated and converted into a serial bit stream. The serial bit stream contains the configuration data that will configure the various configurable elements in integrated circuit 2 so as to configure integrated circuit 2 to realize the user-specific circuit. Each field programmable gate array manufacturer generally supplies an associated programming tool for programming the manufacturer's field programmable gate arrays. The programming and analysis tool 4 of the present invention is, in one embodiment, an extension and improvement upon such a programming tool.

In the example illustrated, processor core 5 is a "hard core" as opposed to a "soft core". The term hard core indicates that the circuitry of the processor is not fashioned from programmable logic as other parts of the user-specific circuit typically would be, but rather the core is a hardwired circuit. The interconnect of the processor core is not programmed to realize the processor and is not reconfigurable.

Although processor core 5 in the present example is a "hard core", this need not be the case. Processor core 5 may, in other embodiments be a soft core where the circuitry of the processor is fashioned from programmable logic. The programmable logic may either be one time programmable, or may be reconfigurable logic such as the programmable logic of an SRAM-based FPGA.

Figure 2:
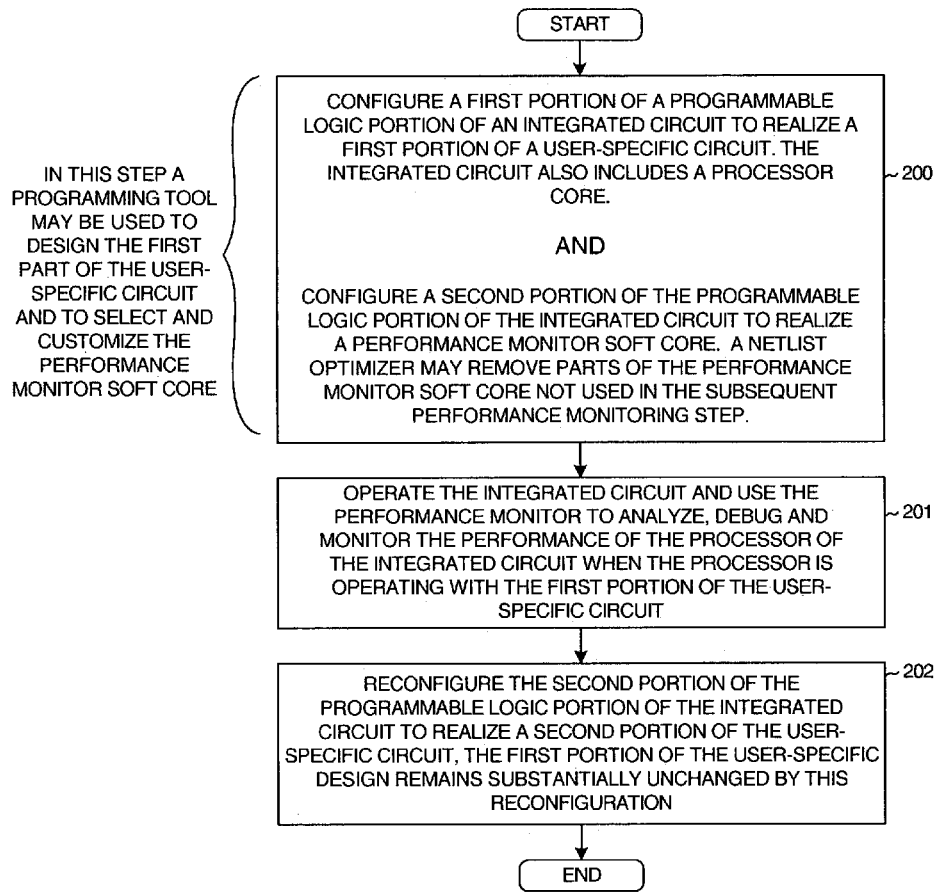
FIG. 2 is a flow-chart of a method carried out in conjunction with the system of FIG. 1.

FIG. 2 is a flow chart of a method in accordance with an embodiment of the present invention. First (step 200) a first portion of a user-specific circuit is realized in a first portion 9 of the programmable logic of integrated circuit 2 and a performance monitor is realized in a second portion 10 of integrated circuit 2. This configuration of integrated circuit 2 can be carried out in numerous ways. In one example, a user designs a user-specific circuit using programming and analysis tool 4. The user-specific design includes both the first portion of the user-specific circuit that is to be realized in first portion 9 of integrated circuit 2 as well as processor core 5. The user-specific circuit may, for example, be designed by describing the circuit functionality using a hardware definition language such as VHDL or Verilog, or the circuit may be entered into programming and analysis tool 4 in the form of a schematic. A combination of these design techniques can be used. The performance monitor is designed in a similar fashion. In one example, programming and analysis tool 4 presents the user with a virtual software toolbox of soft core circuits that can be incorporated into a user design. One such soft core circuit available to the user is a performance monitor soft core.

The combined user-specific circuit (including the first portion of the user-specific circuit, the performance monitor) is then "compiled" to generate a serial bit stream that is communicated across serial link 3 to integrated circuit 2. Configuration data in the serial bit stream configure integrated circuit 2 such that the first portion of the user-specific circuit is realized in the first portion 9 of the programmable logic portion of the integrated circuit and such that the performance monitor soft core is realized in the second portion 10 of the programmable logic portion of the integrated circuit.

In one embodiment, the design process involves the user selecting a general purpose and relatively large performance monitor soft core. When the soft core is instantiated into the user's design and the user's design is compiled, a netlist optimizer within programming and analysis tool 4 identifies parts of the performance monitor circuitry that will not be used in testing of the user-specific design. The netlist optimizer removes these unused portions of the performance monitor from the circuit to be compiled such that the resulting performance monitor as it is realized on the integrated circuit is not unnecessarily large.

Next (step 201 of FIG. 2), the user operates integrated circuit 2 such that processor core 5 executes software code and interacts with the first portion 9 of the user-specific circuit. During this operation, performance monitor 10 measures the speed/behavior of processor core 5. Because the circuitry that realizes performance monitor 10 is programmable logic, the user can design and incorporate a customized performance monitor tailor-made to the user's requirements.

Figure 3:
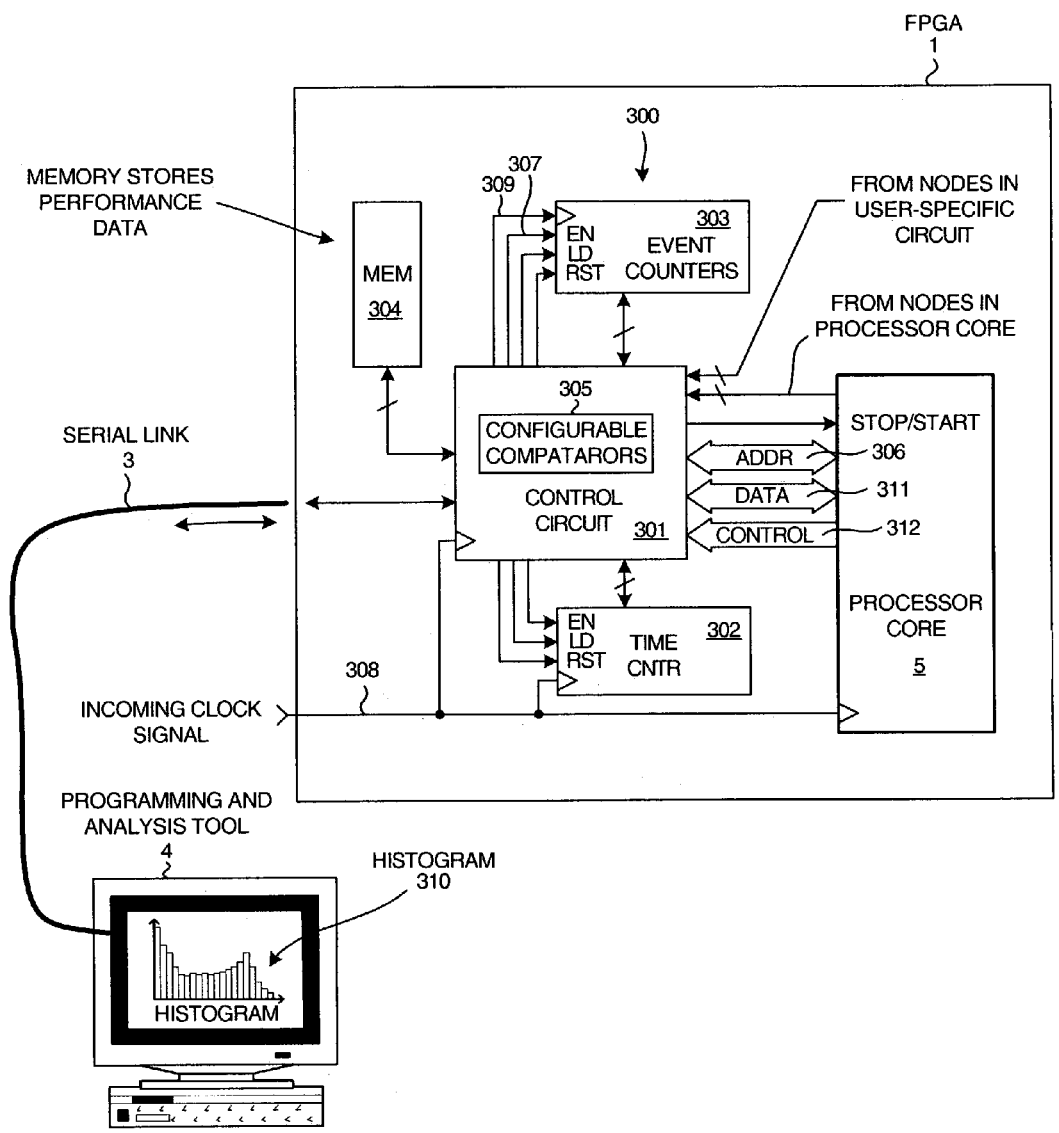
FIG. 3 is a simplified diagram showing a performance monitor realized in the integrated circuit 2 of FIG. 1.

FIG. 3 is a simplified diagram of one performance monitor 300 that may be realized on integrated circuit 2 in accordance with the method of FIG. 2. Performance monitor 300 includes a control circuit 301, a time counter 302, a plurality of event counters 303, and a memory 304. The control circuit 301 includes user-configurable comparators 305 that compare the address on the address bus 306 of the processor to a user-selectable address. If the address on the address bus is greater than a smaller user-selected address programmed into a first configurable comparator, then the first comparator outputs a first in-range signal. If the address on the address lines is smaller than a larger user-selected address programmed into a second configurable comparator, then the second comparator outputs a second in-range signal. An AND gate in control circuit 301 combines the first and second in-range signals and outputs a signal indicative of whether the address on the address bus is in an address range defined by the smaller and the larger user-selected addresses. Using this technique, the full address range of the address on the address bus is divided into smaller address ranges such that a pair of configurable comparators is used to generate a signal indicative of whether the address on the address bus is in each of the ranges. When the address is within a particular one of these ranges, control circuit 301 enables a corresponding one of the event counters 303 via the enable line 307 of the appropriate event counter. In this example, the event is the passing of time. Control circuit 301 therefore supplies the incoming clock signal on line 308 to the line 309 that leads to the clock input of the event counters. Each event counter therefore counts the number of clock periods that the processor spends in its associated address range. This counting of clock period continues as long as a value output by time counter 302 is less than a selected maximum value. Control circuit 301 starts the time counter 302 counting and disables the counting of all the event counters when the time counter 302 reaches the selected maximum value. The selected maximum value marks the end of an acquisition period. Once the end of the acquisition period is reached, control circuit 301 sends a signal over serial link 3 to the programming and analysis tool 4. The programming and analysis tool 4 then sends serial commands to the control circuit 301 to read back the count values of the various event counters 303. The user can then use the programming and analysis tool 4 to display a histogram 310. In the example illustrated in FIG. 3, the vertical axis of histogram 310 represents a number of counts. The various address ranges of the address on address bus 306 are displayed along the horizontal axis. By examining histogram 310, the user can see the relative proportion of time that the processor spends in each of the address ranges.

In the present example of performance monitor 300, other data can be collected and stored in association with each of the address ranges. Control circuit 301 stores the data associated with an address range into a corresponding set of memory locations in memory 304. The programming and analysis tool 4 reads the contents of memory 304 via control circuit 301 and provides the retrieved data to the user for analysis.

It is to be understood that the histogram-generating performance monitor 300 described here is a very simple performance monitor. It is presented only as an illustrative example. A more realistic performance monitor that would be instantiated into a user design would typically include breakpoint setting capabilities, the ability to halt the processor and examine the states of various nodes both in the processor core and in the user-specific circuit, the ability to latch the data on the data bus 311 and the control signals on the control bus 312 and to store this information in memory 304 upon user-selectable events, a time stamp counter, the ability to single step the processor, the ability to write to registers with the processor, the ability to record data about the processor's interaction with memory including cache misses, and the ability to record the amount of time that has passed between events. Performance monitor 300 may have any or all of the capabilities of the performance monitors of the prior art including those set forth in U.S. Pat. No. 6,351,724, U.S. Pat. No. 5,867,644, U.S. Pat. No. 5,835,702 and U.S. Pat. No. 5,581,482. The subject matter of these patents is incorporated herein by reference.

Once the user has finished using the performance monitor to analyze, debug and/or monitor the performance of the processor, the second portion 10 of the programmable logic portion of integrated circuit 2 where the performance monitor was realized is made available for uses other than the performance monitor because the performance monitor is no longer needed. In one embodiment, second portion 10 of integrated circuit 2 is reconfigured (step 202) to realize a second portion of the user-specific circuit. This second portion of the user-specific circuit is generally a portion of the user-specific circuit the design and operation of which does not significantly impact the performance of the processor. The reconfiguring of second portion 10 is preferably carried out so that the performance of the processor in its interaction with the first portion of the user-specific circuit is not affected. The analysis of the performance of the processor previously done therefore is still applicable even though the performance monitor circuitry is no longer present.

Because the performance monitor does not remain in the integrated circuit as it is ultimately configured and used by the user, a complex and relatively large performance monitor can be used to debug processor operation without increasing the cost of the integrated circuit needed to embody the user-specific circuit as is the case with conventional performance monitors. The second portion 10 of the integrated circuit used to realize the performance monitor is later usable in the user-specific circuit.

Because the performance monitor is realized from programmable logic, the performance monitor circuitry can be customized to the full extent permitted by the programmable logic. The functionality of the performance monitor is not limited to the predetermined functions of a general purpose performance monitor. For example, where a conventional general purpose hardwired performance monitor may have a fixed number of event counters, event counters with a fixed number of bits, comparators that compare values of fixed lengths, a fixed number of event comparators, a time counter that counts with one set count sequence, and a programmable state machine that has a predetermined maximum number of states, a performance monitor embodied in programmable logic in accordance with the present invention need not have these limitations. For example, the user can design the performance monitor to have an arbitrary and user-selectable number of counters, to have comparators of arbitrary and user-selectable lengths, to have counters with user-defined count sequences, and to have programmable state machines where the maximum number of states as determined by the number of sequential logic elements in the state machine is user-definable.

Figure 4:
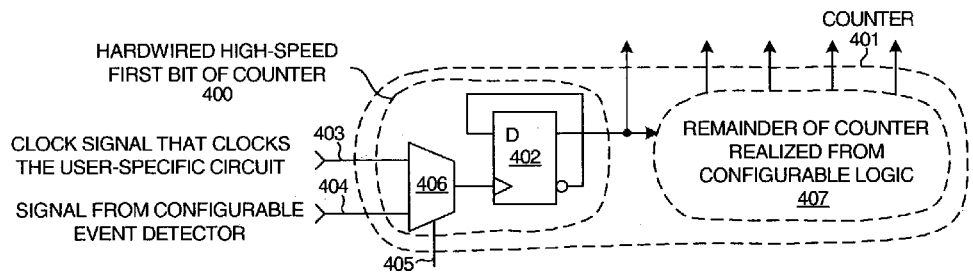
FIG. 4 is a diagram of a non-reconfigurable, hardwired, high-speed portion of a performance monitor in accordance with some embodiments of the present invention.

FIG. 4 is a simplified diagram of a part of performance monitor 300 in accordance with another embodiment of the present invention. It may be desirable to clock one or more of the counters of performance monitor 300 with a high speed clock such as, for example, the clock signal that clocks the processor or the clock signal that clocks another part of the user-configurable circuit. It may even be desirable to count clocks of a frequency higher than the frequency of the clock signal that clocks the processor. In such situations, the maximum speed of a large synchronous counter realized using programmable logic may not be high enough. In accordance with one embodiment of the present invention, a first portion 400 of a counter 401 is realized out of hardwired circuitry. This first portion 400 of counter 401 has the ability to clock at a higher frequency than had this first portion been realized using configurable logic. In the example of FIG. 4, first portion 400 is a high-speed toggle flip-flop 402 that serves as the first bit of the counter. Toggle flip-flop 402 receives its clock signal from a selectable one of the clock signals that clocks the user specific circuit on line 403 and an event signal received on line 404 from an event detector within control circuit 301. Which of the two signals clocks flip-flop 402 is user-selectable and is determined by a select signal on the select input 405 of multiplexer 406. This select signal is received from control circuit 301. The remainder 407 of counter 401 is realized from configurable logic. If clocking speed is a concern, the remainder 407 of counter 401 may be a linear feedback shift register. Accordingly, selected parts of the performance monitor may not be fashioned from programmable logic and may not be reconfigurable to serve as part of the user-specific circuit. Specialized performance monitor circuitry other than the first bit (or bits) of a high-speed counter may be provided in hardwired, non-reconfigurable form.

Although certain specific exemplary embodiments are described above in order to illustrate the invention, the invention is not limited to the specific embodiments. Although a single programming and analysis tool is described, two or more external devices may be employed for the same purpose. A first external device may be used to program the performance monitor into the integrated circuit, and a second external device may be used to receive performance data from the performance monitor so that the performance data can be analyzed. The programmable logic portion used to realize the performance monitor need not be an SRAM-based architecture involving configurable logic blocks and a programmable interconnect structure. Other programmable logic architectures may be employed. The programmable logic portion that is configured to realize the performance monitor need not be reconfigurable in all embodiments. The architecture of the programmable logic portion of the integrated circuit may be a one-time-programmable (OTP) architecture such as, for example, an antifuse field programmable gate array architecture. Where the performance monitor is realized using OTP technologies, benefits associated with having a fully customizable performance monitor and a virtual software toolbox of soft core circuits are realizable even though the circuitry that is used to implement the performance monitor itself cannot be removed from the user's design.

Although the present invention is described in connection with the processor on a single integrated circuit being monitored, and then the performance monitor being removed from that integrated circuit so the user-specific circuit embodied in that integrated circuit can be used, it is to be understood that advantages set forth above are realizable without an integrated circuit ever being reconfigured to remove a previously realized performance monitor. For example, a performance monitor can be realized on a first integrated circuit so that first integrated circuit is used to debug processor operation. Then, after debugging and performance monitoring tasks are completed, rather than reconfiguring the programmable logic portion on the same integrated circuit used for performance monitoring, a second integrated circuit is configured with all the circuitry of the first integrated circuit but for the performance monitor. Accordingly, various modifications, adaptations, and combinations of various features of the described embodiments can be practiced without departing from the scope of the invention as set forth in the following claims.

What is claimed is:

1. In an integrated circuit comprising a programmable logic portion and a processor core, a method comprising:
    configuring a first portion of the programmable logic portion to realize a performance monitor for monitoring the processor core;
    configuring a second portion of the programmable logic portion to realize a first portion of a user-specific circuit comprising a portion of the user-specific circuit selected to interact with the processor core;
    executing software code on the processor core to interact with the first portion of the user-specific circuit;
    using the performance monitor to monitor the processor core;
    wherein the performance monitor comprises a counter that monitors speed of the processor core interacting with the first portion of the user-specific circuit, the counter having a higher speed portion and a lower speed portion,
    wherein the higher speed portion is implemented in hardwired circuitry, and the lower speed portion is implemented in the programmable logic portion; and
    reconfiguring the first portion of the programmable logic portion with a second portion of the user-specific circuit, wherein the lower speed portion of the performance monitor is removed and the integrated circuit comprises a complete user-specific circuit.

2. The method of claim 1, wherein the programmable logic portion of the integrated circuit comprises a plurality of configurable logic blocks and a programmable interconnect structure, the programmable interconnect structure being configurable to connect the programmable logic blocks together.

3. The method of claim 2, further comprising:
    providing a programming tool that allows a user to select a performance monitor soft core programming option such that if the performance monitor soft core programming option is selected then the programming tool outputs configuration data that configures the programmable logic portion of the integrated circuit to realize the performance monitor.

4. The method of claim 3, further comprising:
    using the programming tool to receive performance data collected by the performance monitor.

5. The method of claim 1, wherein the processor core is a hard core.

6. The method of claim 1, wherein the processor core is a soft core.

7. The method of claim 1, wherein the performance monitor comprises a counter usable to count events, the counter having a user-selectable number of bits.

8. The method of claim 1, wherein the performance monitor comprises a comparator that compares a first value to a second value, the first and second values being multi-bit values having a user-selectable number of bits.

9. The method of claim 1, wherein the performance monitor comprises a counter having a user-selectable count sequence.

10. The method of claim 1, wherein the performance monitor includes a histogram time period counter, an event counter, and a memory, and wherein the performance monitor stores event counts output by the event counter in consecutive histogram time periods into respective associated memory locations in the memory.

11. The method of claim 1, wherein the higher speed portion of the counter comprises a hardwired high speed first bit.

12. The method of claim 1, wherein the programmable logic portion is an SRAM-based field programmable gate array structure.

13. The method of claim 1, wherein the configuring of a first portion of the programmable logic portion includes configuring the integrated circuit such that a first part of a user-specific circuit is embodied by the programmable logic portion of the integrated circuit, the method further comprising:
configuring a second integrated circuit such that a programmable logic portion of the second integrated circuit embodies circuitry substantially identical to the first part of the user-specific circuit, wherein the second configured integrated circuit is substantially identical to the first configured integrated circuit except that the second configured integrated circuit does not include a performance monitor embodied in programmable logic.

14. An integrated circuit comprising:
a processor core executing software code;
programmable logic comprising configurable logic blocks and a programmable interconnect structure usable to connect the programmable logic blocks together;
a portion of a user-specific circuit implemented in a first portion of the programmable logic, wherein the portion of the user-specific circuit comprises a portion of the user-specific circuit selected to interact with the processor core which has a more significant impact on the performance of the processor core than a remaining portion of the user-specific circuit; and
a performance monitor comprising a counter that monitors speed of the processor core executing software code to interact with the portion of the user-specific circuit, the performance monitor comprising a counter having a higher speed portion and a lower speed portion,
wherein the higher speed portion is implemented in hardwired circuitry and the lower speed portion is implemented in a second portion of the programmable logic,
wherein the second portion of the programmable logic is reprogrammed such that the lower speed portion of the performance monitor is removed and the integrated circuit comprises a complete user-specific circuit.

15. The integrated circuit of claim 14, wherein the processor core is a hard core.

16. The integrated circuit of claim 14, wherein the processor core is a soft core.

17. The integrated circuit of claim 14, wherein the performance monitor comprises a counter having a user-selectable number of bits.

18. The integrated circuit of claim 14, wherein the performance monitor stores performance data, and wherein the performance monitor communicates with a device external to the integrated circuit, the device being usable to analyze and display the performance data.

19. A system, comprising:
an integrated circuit comprising a processor core executing software code and other circuitry comprising a counter having a higher speed portion and a lower speed portion,
wherein the higher speed portion is implemented in hardwired circuitry and the lower speed portion is implemented in programmable logic;
means for monitoring performance of the processor core using the counter of the other circuitry such that, after speed of the processor core executing software code to interact with a selected portion of a user-specific circuit has been monitored by the means, the lower speed portion of the other circuitry is usable for a purpose other than performance monitoring of the processor core; and
means for reprogramming the lower speed portion of the other circuitry with another portion of the user-specific circuit such that a performance monitor is removed and the integrated circuit comprises a complete user-specific circuit, wherein the other portion of the user-specific circuit impacts the performance of the processor less than the selected portion of the user specific circuit of the other circuitry.

20. The system of claim 19, wherein the other circuitry comprises a plurality of configurable logic blocks and a programmable interconnect structure usable to connect the configurable logic blocks together.

21. The system of claim 19, wherein the means for monitoring is coupled to the integrated circuit for receiving performance data from the integrated circuit and for generating a histogram.

22. A method, comprising:
configuring a first portion of configurable circuitry of an integrated circuit with a first portion of a user-specific circuit comprising a portion of the user-specific circuit selected to interact with a processor;
providing a counter to monitor a speed of the processor executing software code to interact with the first portion of the user-specific circuit, the counter having a higher speed portion and a lower speed portion, wherein the higher speed portion is implemented in hardwired circuitry, and wherein the lower speed portion is implemented in the configurable circuitry; and
reconfiguring the lower speed portion of the counter implemented in the configurable circuitry with a remaining portion of the user-specific circuit such that the lower speed portion of the counter is removed and the integrated circuit comprises a complete user-specific circuit.

23. The method of claim 22, wherein the counter has a number of bits, and wherein one of the bits toggles at a faster frequency than any other of the bits of the counter, said one bit being the higher speed portion of the counter.

24. The method of claim 22, wherein the counter is taken from the group consisting of: a time counter and an event counter.

25. The method of claim 22, further comprising:

after the counter has been used to monitor the performance of the processor, reconfiguring the lower speed portion to be a part of the user-specific circuit.

26. The method of claim 22, wherein the counter and the processor are parts of a single integrated circuit.

27. An integrated circuit comprising an amount of hardwired circuitry and an amount of configurable logic, the integrated circuit comprising:

a first portion of configurable logic configured to implement a first portion of a user-specific circuit, wherein the first portion of the user-specific circuit comprises a selected portion of the user-specific circuit;

a processor executing software code to interact with the first portion of the user-specific circuit;

a counter that monitors speed of the processor interacting with the user-specific circuit of the first portion of the configurable logic, the counter having a higher speed portion and a lower speed portion, wherein the higher speed portion is a part of said hardwired circuitry, and wherein the lower speed portion is implemented in said configurable logic;

wherein the configurable logic having the lower speed portion of the counter is reconfigured with a second portion of the user-specific circuit such that the lower speed portion of the counter is removed and the integrated circuit comprises a complete user-specific circuit.

28. The integrated circuit of claim 27, wherein the counter is taken from the group consisting of: a time counter and an event counter.

* * * * *